United States Patent [19]
Giuliano

[11] 4,429,393
[45] Jan. 31, 1984

[54] DOUBLE PHASE-CONJUGATE RING RESONATOR

[75] Inventor: Concetto R. Giuliano, Malibu, Calif.

[73] Assignee: Hughes Aircraft Company, El Segundo, Calif.

[21] Appl. No.: 273,121

[22] Filed: Jun. 12, 1981

[51] Int. Cl.³ .............................................. H01S 3/10
[52] U.S. Cl. ........................................ 372/21; 372/94; 372/20; 356/350; 350/393
[58] Field of Search .................. 307/425, 428; 372/21, 372/20, 94; 356/350; 350/393, 354, 389, 390

[56] References Cited

U.S. PATENT DOCUMENTS

| | | | |
|---|---|---|---|
| 3,393,955 | 7/1968 | Sterzer | 350/393 |
| 3,528,029 | 9/1970 | Holmboe et al. | 350/393 |
| 4,040,718 | 8/1977 | Bjorklund et al. | 350/393 |
| 4,321,550 | 3/1982 | Evtohov | 307/425 |
| 4,344,042 | 8/1982 | Hon | 307/428 |

OTHER PUBLICATIONS

"Servo Tuning and Stabilization of Nonlinear Optical Crystals" by Bjorklund et al; *IEEE Jour. Quant. Elect.* vol. QE-15, No. 4, Apr. 1979.

*Primary Examiner*—William L. Sikes
*Assistant Examiner*—Léon Scott, Jr.
*Attorney, Agent, or Firm*—J. Dennis Moore; D. W. Collins; A. W. Karambelas

[57] ABSTRACT

Apparatus for providing an amplified, phase-conjugated output beam. A nonlinear medium, gain medium, and output device are disposed along an optical path to form a ring resonator. An external laser source provides laser light to one end of the nonlinear medium which induces stimulated Brillouin scattering in the medium. Light provided by the gain medium at a first predetermined frequency is reflected from the acoustic waves traversing the nonlinear medium at a second predetermined frequency. The reflected light traverses the optical path through the gain medium and impinges upon the other end of the nonlinear medium, where it is further reflected from the acoustic waves. This reflected light is frequency shifted to the original predetermined frequency. A portion of the light at the predetermined frequency is coupled out of the resonator as an amplified phase-conjugated output beam by means of the output device. Alternatively, output beams at both the first and second predetermined frequencies may be provided.

6 Claims, 2 Drawing Figures

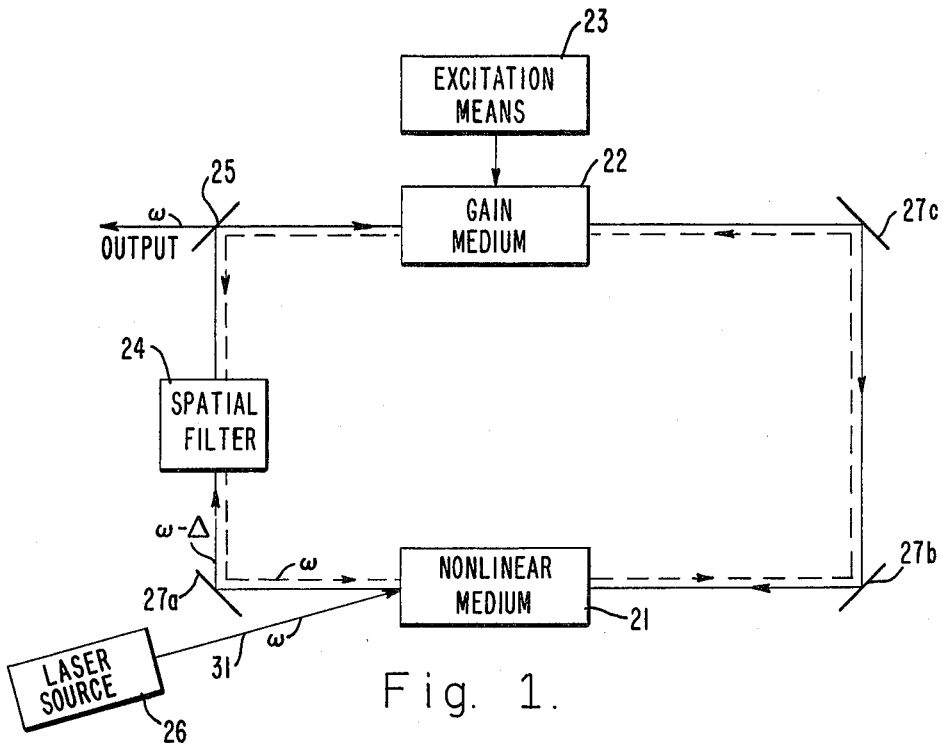
Fig. 1.
Fig. 2.
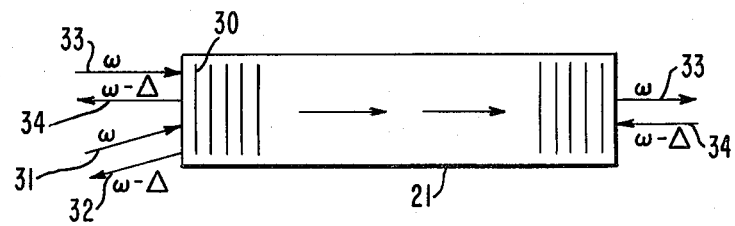

DOUBLE PHASE-CONJUGATE RING RESONATOR

BACKGROUND OF THE INVENTION

The present invention relates generally to optical resonators, and more particularly, to optical ring resonators which employ the principles of phase conjugation.

A great deal of research and development is currently in progress which relates to the application of phase conjugation principles to the correction of laser beam profiles. In particular, the phase conjugation process known as stimulated Brillouin scattering has received wide theoretical attention, both in terms of determining a theoretical understanding of the process and in experimentation related thereto.

Numerous publications exist which discuss various features of stimulated Brillouin scattering as they apply to various laser sources and associated nonlinear media in which the scattering process may occur. These publications include "Multiple Stimulated Brillouin Scattering From a Liquid Within a Laser Cavity", by A. J. Alcock et al, Applied Physics Letters, Vol. 11, No. 2, 15 July 1967; "Cancellation of Phase Distortion in an Amplifying Medium With a Brillouin Mirror", Nosach et al, ZhETF Pis. Red. Vol. 16, No. 11, 5 Dec. 1972; "Connection Between the Wavefronts of the Reflected and Exciting Light in Stimulated Mandel'Shtam-Brillouin Scattering", Zel'dovich et al, ZhETF Pis. Red. Vol. 15, No. 3, 5 February 1972; "Correction of Phase Aberrations Via Stimulated Brillouin Scattering", Wang et al, Optics Letters, Vol. 2, page 4, January 1978; and "Stimulated Brillouin Scattering in Optical Fibers", E. P. Ippen et al, *Applied Physics Letters, Vol.* 21, No. 11, 1972.

However, although there has been much research and development in the phase conjugation area, the concepts of phase conjugation have not been applied to ring resonator devices. Ring resonators are well-known in the laser art, and exemplary ring resonators are shown and discussed in U.S. Pat. No. 3,691,477, and publications by C. L. Tang et al, Journal of Applied Physics, Vol. 34, p. 2289 (1963) and A. H. Rosenthal, *JOSA*, Vol. 52, p. 1143 (1963).

Therefore, it would be an improvement in the laser art to provide a ring resonator device which employs the concepts of stimulated Brillouin scattering, and which is capable of providing a phase-compensated difraction-limited output beam.

SUMMARY OF THE INVENTION

The present invention provides for a double phase-conjugate ring resonator which employs the principles of stimulated Brillouin scattering to obtain a phase-compensated diffraction-limited output beam. The resonator comprises a nonlinear medium which is capable of undergoing stimulated Brillouin scattering disposed along an optical path. A gain medium is also disposed along the optical path, which amplifies light within a predetermined frequency band. The light provided by the gain medium traverses the optical path in both directions and impinges upon opposite ends of the nonlinear medium. A laser source is provided which applies light to one end of the nonlinear medium in order to induce stimulated Brillouin scattering within the medium. This requires that the laser source, which is commonly referred to as the pump source, provide light energy of sufficient power to exceed a power threshold above which stimulated Brillouin scattering occurs in the medium. An output element, such as a dichroic mirror, broadband reflective mirror, or beam splitter, or the like, is disposed along the optical path in order to extract light energy from the ring resonator and provide an output beam therefrom.

The light provided by the laser source (at frequency $\omega$) impinges upon one end of the nonlinear medium and induces stimulated Brillouin scattering therein. In the stimulated Brillouin scattering process, acoustic waves are generated by the process of electrostriction within the medium, which traverse the medium toward the other end thereof. Light generated by the gain medium traverses the optical path and is reflected from the acoustic waves in the medium. If the light provided by the gain medium is at a frequency $\omega$, then the reflected light from the one end of the nonlinear medium will be at a frequency $\omega - \Delta$, where $\Delta$ is the Doppler shift due to the receding acoustic wave. This light, at frequency $\omega - \Delta$, is reflected back along the optical path through the gain medium to the other end of the nonlinear medium. When the light impinges upon the other end of the non-linear medium, it encounters an oncoming acoustic wave from which it is reflected. Upon reflection the frequency of the light is upshifted from $\omega - \Delta$ due to the Doppler shift provided by the acoustic wave.

Thus, the light traversing in one direction along the optical path is at a frequency $\omega$ while the light traveling in the other direction is at a frequency $\omega - \Delta$. These counter-propagating waves are continually reflected from either end of the nonlinear medium to sustain the resonator operation. The gain medium may have a bandwidth which is capable of amplifying light at frequency $\omega$ or it may have a bandwidth wide enough to amplify light at both frequency $\omega$ and $\omega - \Delta$. The use of the dichroic mirror, for example, allows for selective output coupling of a particular frequency of light. The use of the broadband reflective mirror allows coupling of output beams at a plurality of predetermined frequencies, namely $\omega$ and $\omega - \Delta$.

Since the stimulated Brillouin scattering process is a phase conjugation process, any phase distortions which are encountered due to light traversing the ring resonator are corrected to provide for a more diffraction-limited output beam. The fact that the present invention employs a double phase-conjugation process, in that the light is downshifted at one end of the nonlinear medium and upshifted at the other, eliminates potential walk-off problems which might exist in systems employing a single phase conjugate mirror. The walk-off problem is one in which the light impinging upon a single stimulated Brillouin scattering mirror is successively downshifted upon each reflection to the point where the frequency is shifted out of the amplifier bandwidth. Also, the fact that the counter-progagating light is at two frequencies, eliminates any potential standing wave problem which possibly may exist in conventional ring resonators.

BRIEF DESCRIPTION OF THE DRAWING

Various features and advantages of the present invention may be more readily understood with reference to the following detailed description taken in conjunction with the accompanying drawing, wherein like reference numerals designate like structural elements and in which:

FIG. 1 illustrates a ring resonator in accordance with the principles of the present invention; and FIG. 2 is an illustration useful in explaining the stimulated Brillouin scattering process employed in the present invention.

DETAILED DESCRIPTION OF THE INVENTIONS

Referring to FIG. 1 there is shown a double phase-conjugate ring resonator in accordance with the principles of the present invention. The ring resonator comprises a nonlinear medium 21 which is capable of undergoing stimulated Brillouin scattering. Typical nonlinear media include solids, such as fused quartz, or the like, gases such as methane, or the like, and liquids such as carbon disulfide, or the like. The nonlinear medium 21 is disposed along the optical path which is defined by optical elements 25, and 27a, b, c. The optical elements 27a, b, c may be reflecting surfaces such as plane mirrors, or the like, while the optical element 25 is used as an output coupling device, such as a dichroic mirror, broadband reflective mirror, or beam splitter, or the like.

A gain medium 22 and associated excitation means 23 is disposed along the optical path. The gain medium 22 has a predetermined amplifying bandwidth which generally amplifies light at frequencies in the vicinity of a frequency $\omega$. Typical gain media include such substances stances as carbon dioxide, or YAG or ruby crystals, or the like. A spatial filter 24 which is commonly used in laser systems, is also disposed along the optical path. Typical of spatial filters is an arrangement comprising two lenses with a pin hole aperture disposed therebetween. The spatial filter 24 is employed to maintain single mode laser operation.

A laser source 26 is provided which applies an output beam 31 (or pump beam 31) to one end of the non-linear medium 21. The output power of the laser source 26 must exceed the power threshold above which stimulated Brillouin scattering occurs in the nonlinear medium 21. In addition, the frequency of the light emitted by the laser source 26 is generally the same frequency as is amplified by the gain medium 22, although this is not an absolute requirement.

In operation, the laser source 26 provides a pump beam to initiate and sustain the stimulated Brillouin scattering within the nonlinear medium 21. The pump beam is generally injected onto one end of the nonlinear medium at a slight angle, usually around 1° or so, with respect to the forementioned optical path. The interaction between the laser light and the nonlinear medium 21 produces acoustic waves within the medium 21 which progress across the medium 21 to the right. The acoustic waves are generated by means of a process known as electrostriction, wherein the interaction between the high intensity laser light and the nonlinear medium generates sound waves therein. The acoustic waves have a spatial pattern within the nonlinear medium 21 which corresponds to the phase front distribution of the applied laser light which initiated the scattering process. The acoustic waves act as mirror surfaces for any light which subsequently impinges upon the acoustic surfaces.

By activating the gain medium 22 by means of the excitation means 23, photons will start to traverse the optical path and hence impinge upon the left side of the nonlinear medium 21. These photons will be reflected from the acoustic waves and travel back through the gain medium along the optical path and impinge upon the opposite end of the nonlinear medium 21. The photons that reach the right side of the nonlinear medium 21 will also also be reflected from the acoustic waves in the medium 21 and be reflected in the opposite direction along the optical path through the gain medium 22 and back to the left side of the nonlinear medium 21.

Given that the gain medium 22 provides light at a frequency $\omega$, then the light which is reflected from the left side of the nonlinear medium 21 will be reflected at a frequency $\omega - \Delta$, where $\Delta$ is the Doppler frequency shift due to the receding acoustic wave. Thus, light at a frequency $\omega - \Delta$ is reflected and traverses in a clockwise fashion around the optical path and impinges upon the right side of the nonlinear medium 21. This light at frequency $\omega - \Delta$ encounters an oncoming acoustic wave from which it is reflected, and that reflected frequency is now upshifted to frequency $\omega$. Thus, it can be seen that the light traveling in a clockwise direction is at a frequency $\omega - \Delta$ while the light propagating in a counter-clockwise direction is at a frequency $\omega$.

The gain medium 22 may be designed to amplify light at frequency $\omega$ and hence, an amplified output beam will be provided at frequency $\omega$. The optical element 25 may be generally chosen as a dichroic mirror which selectively passes a preselected frequency such as $\omega$, while reflecting all other frequencies. Alternatively, the gain medium 22 may have bandwidth which is wide enough to amplify both frequency $\omega$ and frequency $\omega - \Delta$. In this instance, the frequency of an amplified output beam may be provided at either $\omega$, $\omega - \Delta$, or both.

Referring now to FIG. 2, there is shown an illustration which is useful in describing the stimulated Brillouin scattering process more fully. The pump beam 31 which may be provided by laser source 26, is made incident upon the nonlinear medium 21. As mentioned hereinabove, this pump beam is at a frequency $\omega$ and has a power level which is above the minimum power threshold necessary to induce stimulated Brillouin scattering in the nonlinear medium 21. The interaction between the pump beam 31 and the nonlinear medium 21 initiates receding acoustic waves 30 in the medium by means of the process of electrostriction. A better understanding of the process of electrostriction may be obtained with reference to the publications cited in the background of the present specification. The stimulated Brillouin scattering process generates a backscattered phase-conjugated beam 32 at a frequency $\omega - \Delta$. However, for the purposes of the present invention, this particular backscattered beam 32 is not utilized.

Recent experiments by Basov et al, published in Applied Physics, Vol. 20, page 261, 1979, have shown that a third beam, such as is provided by beam 33 at frequency $\omega$, made incident upon the nonlinear medium 21 from the left at a small angle as shown, will be reflected from the nonlinear medium 21. This reflected beam 34 will also be phase conjugated and will be downshifted to a frequency $\omega - \Delta$. Moreover, the reflection coefficient of beam 33, that is, the ratio of intensities of beam 34 to beam 33, will be equal to the reflection coefficient of beam 31, given by the ratio of intensities of beam 32 to beam 31. Reflection of the incident beams 31 and 33 results from the generation of the acoustic waves 30 by way of the stimulated Brillouin scattering process. The reflectivity of the acoustic waves 30 may be controlled by controlling the intensity level of the pump beam 34. For instance, the reflectivity of the acoustic waves 30 may be made very large, approaching unity for pump intensities which are three or four times over the stimulated Brillouin scattering threshold.

The reflected beam 34 at frequency $\omega - \Delta$ traverses the optical path and is made incident upon the nonlinear medium 21 from the right, where it encounters the oncoming acoustic waves 30. The interaction between the reflected beam 34 and the acoustic waves 30 generates a backscattered phase conjugated beam 33 which is at frequency $\omega$. Thus, the counter-propagating beams 33, 34 are upshifted and downshifted upon encountering the opposite sides of the nonlinear medium 21 and interacting with the traveling acoustic waves 30.

It is to be noted that for proper operation of the resonator, the intensity of the counter-propagating beams 33, 34 must not exceed the stimulated Brillouin scattering threshold. The intensity levels of the counter-propagating beams 33, 34 may be easily controlled by appropriate adjustment of the gain in the gain medium 22 and/or control of the output coupling by means of optics element 25.

Thus, the present invention provides for a laser ring resonator which generates an amplified, phase conjugated output beam at either of two predetermined frequencies. The ring resonator does not encounter any standing wave problems which is possible with conventional ring resonator designs. Also, as in other systems which employ stimulated Brillouin scattering devices, the potential for frequency walk-off problems, wherein the laser frequency shifts out of the gain bandwidth of the gain medium, is eliminated.

Thus, there has been disclosed a new and improved laser ring resonator employing the principles of phase conjugation, and stimulated Brillouin scattering in particular. The resonator provides a phase-compensated, diffraction-limited output beam at a plurality of frequencies. Potential standing wave problems of conventional ring resonators has been eliminated. Also, walk-off problems experience in systems employing the stimulated Brillouin scattering process have been eliminated.

It is to be understood that the above-described embodiment is merely illustrative of one of the many specific embodiments which represent applications of the principles of the present invention. Clearly, numerous and varied other arrangements may be readily devises by those skilled in the art without departing from the spirit and scope of the invention. For example, an alternative arrangement is obtained by utilizing a broadband partially reflecting mirror as optical element 25. Use of such a device provides output beams at both frequency $\omega$ and frequency $\omega - \Delta$. The two beams could be used separately or appropriately combined into one beam containing both frequencies.

What is claimed is:

1. A double phase-conjugate ring resonator comprising:

a plurality of optical energy reflecting elements disposed along a closed optical path;

a nonlinear medium disposed along said optical path, said medium being capable of undergoing stimulated Brillouin scattering;

a gain medium disposed along said optical path for providing, when excited, amplified laser light at a first predetermined frequency along said optical path which impinges upon opposite ends of said nonlinear medium, such that doppler wavelength shifts, which occur when the laser light impinges upon one end of said nonlinear medium due to the motion of the acoustic waves which give rise to said stimulated Brillouin scattering process are cancelled when the reflected laser light impinges upon the opposite end of said nonlinear medium;

excitation means for exciting said gain medium to provide said amplified laser light;

a laser light source disposed so as to apply laser light to one end of said nonlinear medium, said light having sufficient power to induce said stimulated Brillouin scattering in said nonlinear medium; and output means disposed along said optical path for coupling light at said predetermined frequency out of said path to provide an output beam from said resonator.

2. The resonator of claim 1 which further comprises a spatial filter disposed along said optical path.

3. The resonator of claim 2 wherein said output means comprises a dichroic mirror which selectively couples light at a predetermined frequency out of said resonator as the output beam thereof.

4. The resonator of claim 2 wherein said output means comprises a reflecting mirror capable of reflecting light at said first and second predetermined frequencies out of said resonator as the output beam thereof.

5. The resonator of claim 1 wherein said output means comprises a dichroic mirror which selectively couples light at a predetermined frequency out of said resonator as the output beam thereof.

6. The resonator of claim 1 wherein said output means comprises a reflecting mirror capable of reflecting light at said first and second predetermined frequencies out of said resonator as the output beam thereof.

* * * * *